United States Patent [19]

Eigen et al.

[11] Patent Number: 5,224,536
[45] Date of Patent: Jul. 6, 1993

[54] THERMOSTATTING DEVICE

[75] Inventors: Manfred Eigen, Göttingen; Hajo Otten, Esslingen; Günter Bauer, Krebeck, all of Fed. Rep. of Germany

[73] Assignee: Max-Planck-Gesellschaft zur Forderung der Wissenschaften e.V., Fed. Rep. of Germany

[21] Appl. No.: 688,491

[22] PCT Filed: Nov. 17, 1989

[86] PCT No.: PCT/EP89/01387

§ 371 Date: May 17, 1991

§ 102(e) Date: May 17, 1991

[87] PCT Pub. No.: WO90/05947

PCT Pub. Date: May 31, 1990

[30] Foreign Application Priority Data

Nov. 17, 1988 [DE] Fed. Rep. of Germany ....... 8814398

[51] Int. Cl.$^5$ ............................................. G05D 25/00
[52] U.S. Cl. ........................................... 165/32; 165/2; 165/61; 435/290
[58] Field of Search ............... 165/2, 30, 31, 32, 61; 62/62, 78, DIG. 10; 435/290

[56] References Cited

U.S. PATENT DOCUMENTS

| 3,536,132 | 10/1970 | Pecoraro | 165/30 |
|---|---|---|---|
| 3,616,264 | 10/1971 | Ray | 435/290 |
| 3,818,917 | 6/1974 | Lohr | 165/61 |
| 4,246,955 | 1/1981 | Skals | 165/61 |
| 4,304,293 | 12/1981 | Scheiwe et al. | 165/30 |
| 4,324,285 | 4/1982 | Herilerson | 165/2 |
| 4,388,814 | 6/1983 | Schilling | 62/62 |
| 4,584,275 | 4/1986 | Okano et al. | 435/290 |
| 4,719,830 | 1/1988 | Kawada et al. | 165/32 |
| 4,843,576 | 6/1989 | Smith et al. | 165/30 |
| 5,042,571 | 8/1991 | Drislane | 165/61 |

FOREIGN PATENT DOCUMENTS

| 0094458 | 5/1982 | European Pat. Off. . |
| 0151781 | 12/1984 | European Pat. Off. . |
| 815706 | 9/1949 | Fed. Rep. of Germany . |
| 2073836 | 12/1970 | France . |
| 8702122 | 9/1986 | PCT Int'l Appl. . |

Primary Examiner—A. Michael Chambers
Attorney, Agent, or Firm—Harness, Dickey & Pierce

[57] ABSTRACT

Thermostatting device for adjusting the temperature of a sample to any values within a predetermined temperature range, comprising a main body (12) of good heat-conducting properties which has its first end thermally connected to a first thermostat (14) and its second end thermally connected to a second thermostat (16) that can be set to a temperature different from that of the first thermostat, the main body (12) being sized in such a way that a temperature gradient develops along the main body (12) between these ends, and comprising a sample holder body (22) arranged on the main body (12) for being thermally coupled with the latter at any point between the ends of the main body.

5 Claims, 1 Drawing Sheet

THERMOSTATTING DEVICE

The present invention relates to a thermostatting device for adjusting the temperature of at least one sample to any value within a predetermined temperature range, comprising an elongated main body of good heat-conducting properties which has its first end thermally connected to a first thermostat means that can be set to a first temperature, and has its second end thermally connected to a second thermostat means that can be set to a second temperature, and which is sized in such a way that a temperature gradient develops along the main body, between these two ends, and comprising further a heat-conductive sample holder body that can be brought into contact with the main body, for thermal coupling, at any point between its thermostatted ends.

A thermostatting device of the type described above has been known from DE-OS 2 063 607.

It is a requirement in many chemical and biochemical processes to bring solutions to different temperatures in the course of one and the same experiment. The required temperatures may be in the range of below 0° Centigrade and up to more than 100° Centigrade, and the specific temperatures used in any experiment differ largely within that range. Enzymatic reactions, for example, require temperatures of between 30° Centigrade and 70° Centigrade, depending on the particular enzyme. For heat denaturation of nucleic acids, temperatures of up to 120° Centigrade are used, depending on their chain length and sequence. For stopping reactions, temperatures of around 0° Centigrade are required. The temperatures used for storing samples are considerably below 0° Centigrade. In addition, most of the experiments require quick changes of the solution temperature. Similar requirements have to be met in other fields of science and technology.

There have been known in laboratory practice thermostats and metal-block thermostats that can be adjusted to different temperatures. In the case of liquid thermostats, the reaction vessels are thermostatted by circulating liquid around them. Metal-block thermostats are provided with bores for the reaction vessels, the latter being thermostatted by their contact with the walls of such bores. Heat transmission can be improved by filling the bores with water or oil. The temperature of metal-block thermostats can be adjusted, for example, with the aid of heating cartridges, which are controlled against a constantly operating water or convection cooling system. Further, Peltier elements can be used for heating and cooling metal-block thermostats. Any change in temperature of the samples is effected in the case of the two before-described types of thermostats by heating up or cooling down the whole thermostat.

It is an advantage of the before-described thermostats that a single thermostat is required only for the different temperatures. However, due to the considerable heat storage capacity and thermal inertia of these thermostats, the process of changing the temperature is too slow and too time-consuming for many types of reactions.

Another possibility of adjusting the temperature of samples to different values consists in providing a separate liquid-bath thermostat for each temperature. For a desired temperature of 0°, this may be an ice bath, for example. One then introduces the reaction vessels into the thermostat which is set to the particular desired temperature, which in most cases is effected manually. However, there are also known set-ups where the samples are manipulated with the aid of a robot arm.

It is an advantage of this approach that shorter temperature-changing times can be achieved than in the case of the before-mentioned types of thermostats, the time constant for temperature changes being determined, in the case of well agitated liquid-bath thermostats, by the heat transmission between the liquid and the sample, rather than by the temperature response time of the respective thermostat. However, this solution is expensive and space-consuming given the fact that a separate thermostat is required for each temperature.

The before-mentioned DE-OS-2 063 607 describes a vibrator which is intended for cultivating simultaneously, at different temperatures, a plurality of cultures of microorganisms. In the case of the known vibrator, an aluminium block, which is set into vibrating movement, is heated on its one end and cooled on its other end so that a temperature gradient develops along the aluminium block. The aluminium block is further provided with grooves extending in parallel to its longitudinal direction, and a plurality of bores which serve to receive steel Petri dishes or glass flasks containing the microorganisms to be cultivated.

The known vibrator is intended for incubating simultaneously a plurality of cultures at different temperatures. Changes in temperature of the individual cultures during the many hours or even days of the incubation period are neither envisaged, nor are they necessary. Instead, the cultures—as generally required for the cultivation of microorganism—are are maintained at a constant temperature for the whole incubation period. The broad temperature spectrum of the aluminium block provides the possibility to examine the conditions of growth of different cultures, at different temperatures, on a single vibrator and during one and the same incubation period.

The rapid changes of the temperature of the samples, which are required for the chemical and biochemical methods mentioned at the outset, are not possible with the known vibrator.

EP-A-0 094 458 describes a device where a temperature gradient can be set and varied in an oblong sample holder consisting of a thermally conductive material. There is provided for this purpose a transport means which moves the sample holder a greater or lesser distance along the longitudinal axis of a furnace, into the latter's heating zone, whereby for monitoring the developing temperature gradient, two temperature sensors are arranged separately in the longitudinal direction of the sample holder. The temperature sensor intended for picking up the upper temperature value of the temperature gradient is arranged at the end of the sample holder projecting into the heating zone and is connected to the temperature control of the heating of the furnace, while the temperature sensor assigned to the lower temperature value is connected to the control of the transport means.

The end of the sample holder which is located in the heating zone is heated up to the pre-set furnace temperature by the heat radiation of the furnace, while the end located outside the furnace is cooled by heat dissipation to the surrounding air. The length of the temperature gradient in the longitudinal direction of the sample holder, and the lower temperature value, are determined by the position of the sample holder relative to the heating zone. The shape of the temperature gradient is determined either by means of temperature sensors arranged along the sample holder or by means of temperature sensors which can be displaced along the sample holder. For linearizing the shape of the temperature gradient, an additional intermediate heating zone may be provided upstream of the heating zone whose heating may be controlled by means of another temperature sensor arranged on the sample holder between the two first-mentioned temperature sensors.

The temperature of the samples, which are arranged on the sample holder in fixed relationship, is varied by varying the shape of the temperature gradient in the sample holder. This is effected on the one hand by displacing the sample holder relative to the heating zone and, on the other hand, by adjusting the heating of the furnace to different temperature values. The time required for varying the temperature gradient is a function of the time required for heating up and/or cooling down the sample holder by radiation. In any case, acceptable times can be achieved in this respect only for temperatures far above room temperature. Given the fact, however, that the process of heat exchange by radiation is basically very slow, the process of building up a new temperature gradient always takes a very long time, even at high temperatures.

Further, a method for adjusting the temperature of liquid samples in an automatically operating analyzer has been known from EP-A-0 151 781. This device comprises a rack consisting of a material offering good thermal conductivity and intended to receive the vessels and/or cells containing the liquid samples. The rack is moved back and forth intermittently between the different processing and measuring stations of the analyzer. In its stationary condition, the rack is clamped between two lateral walls of which one at least is heated in order to adjust the rack and, thus, the liquid sample in the vessels to a given temperature.

The known device is intended for carrying out analyses in clinical laboratories. and to prevent disturbing temperature variations from occurring during the analysis processes. This is particularly important for enzyme-kinetic measurements which are highly temperature-responsive and which have to be carried out at exactly defined and reproducible temperatures if comparable results are to be obtained. The samples, therefore, are heated up to a predetermined temperature which is then exactly maintained during the subsequent procedures.

The known device, therefore, only allows the samples to be heated up to a single temperature, while no temperature change can be effected during the further procedures. The known device does not permit to effect the rapid temperature changes in the samples, which are required for the chemical and biochemical methods described at the outset.

Further, a device for the gradual cooling-down and heating-up of biological samples in a time-controlled manner has been known from WO-A1-87/02122. This device comprises a thermally insulated box equipped with a lid and with a basket holding the samples, and further a feeding mechanism by means of which the basket can be lowered and lifted inside the box. A supply of liquid nitrogen is provided on the bottom of the box so that a temperature gradient from $-192°$ Centigrade to room temperature develops between the bottom and the lid. By lowering the basket and closing the lid one then causes the samples to freeze gradually while the temperature gradient disappears by the time due to the closed lid. When the lid is opened and the basket is raised, the temperature gradient builds up again so that the samples thaw gradually.

A comparable device for the controlled and slow freezing-up and thawing of biological samples has been known from U.S. Pat. No. 4,388,814. It distinguishes itself from the before-described device only by the different design of its feeding mechanism.

However, these devices are likewise unsuited for carrying out chemical and biochemical experiments, in particular for varying rapidly the temperatures of samples.

U.S. Pat. No. 4,584,275 describes an incubator by means of which a plurality of liquid samples can be incubated simultaneously. The incubator comprises an outwardly closed heating plate with a peripheral guide channel of rectangular geometry intended for receiving sample holders in the form of small flat dishes. The sample holders, which are introduced into the guide channel via a feed channel, are moved around by steps by means of five slides until they finally, at the end of a pre-determined period of time, reach an optical measuring station. On their way to the measuring station, the samples have been incubated continuously at the temperature of the heating plate, for the pre-determined period of time, so that the measurements can be carried out on all samples in succession, at reproducible conditions. Upon completion of the measurement, the dishes are ejected from the guide channel, and charged with new samples.

Again, this incubator is not suited for producing the rapid changes in temperature of solutions which are frequently required in chemical and biochemical methods.

From DE-PS-815 706 there has been known a heating bed for the thermal examination of substances, which comprises a metal body built up from a plurality of superimposed sheet strips. The metal body is heated up on its one end to a temperature of 300° Centigrade or over, whereby an approximately linear temperature gradient builds up between the hot end and the other end which is cooled by the surrounding air. The metal body is covered by a cover plate of chromium-plated brass which is directly charged with the substances under examination.

A scale, which is capable of being calibrated, permits to determine the temperature at the respective position of the heating bed, so that the melting points, eutectic temperatures, etc., of the substances under examination can be determined.

The heating bed being cooled by thermal radiation, the temperature range available is clearly above ambient temperature. Consequently, it is not possible to carry out chemical and biochemical experiments with the aid of this heating bed, too.

Now, it is the object of the present invention to improve a thermostatting device of the before-mentioned type in such a way as to avoid the disadvantages described above. In particular, the novel thermostatting device is to make it possible, in connection with the carrying out of chemical and biochemical processes, to bring solutions to different temperatures in the course of one and the same experiment, and to bring about the temperature variation in a quick and simple way.

The invention achieves this object by an arrangement where the sample holder body is supported on the main body for displacement in the longitudinal direction, a transport means is provided for displacing the sample holder body, means are provided for pressing the sample holder body against the main body, and the heat flow in the main body as well as the cross-section of the main body are selected in such a way, with a view to achieving rapid temperature changes in the samples, that the amount of heat that has to be supplied or carried off as a result of the temperature variation caused by any displacement of the sample holder body is transferred from the main body to the sample holder body and absorbed by the latter within a period of time suited for chemical and biochemical experiments.

This solves the object underlying the invention. In the case of the thermostatting device according to the invention it is possible to bring a sample to any desired temperature within a predetermined temperature range with the aid of only a single device.

Due to the fact that when varying the sample temperature only the temperature of the sample holder body, with its relatively small heat storage value, has to be changed, rather than the temperature of an entire thermostat, temperature changes can be effected relatively quickly. The contact pressure means have the effect to press the sample holder body against the main body in order to ensure efficient thermal contact. The thermal contact may be further improved by the application of a vacuum, for example.

In addition, the thermostatting device according to the invention can be re-fitted very quickly to accommodate different types of sample holders.

Hereafter, a preferred embodiment of the thermostatting device according to the invention will be described in more detail by reference to the drawings, in which FIG. 1 shows a simplified top view of a thermostatting device according to one embodiment of the invention;

Figure 2:
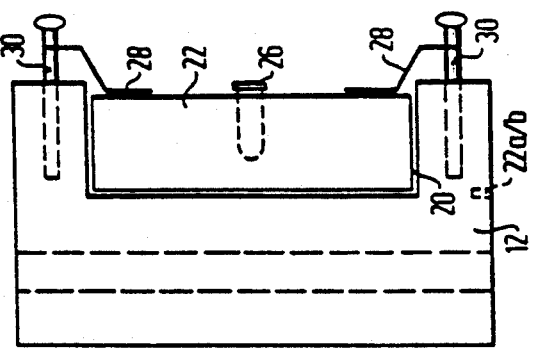
FIG. 2 shows a front view of the thermostatting device according to FIG. 1.
Figure 1:
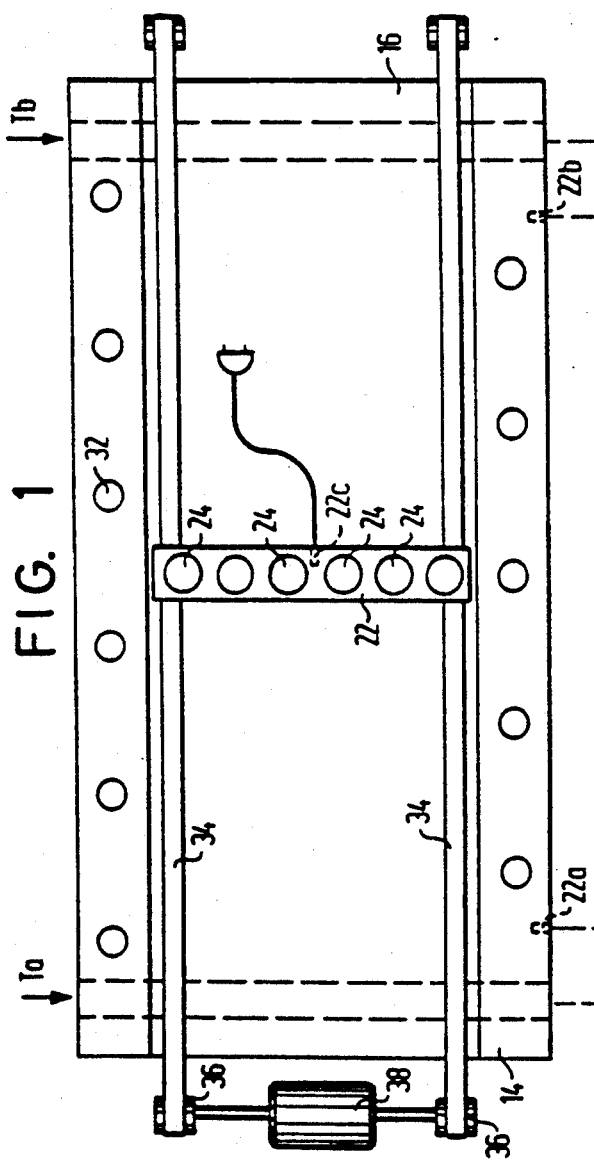
Figure 3:
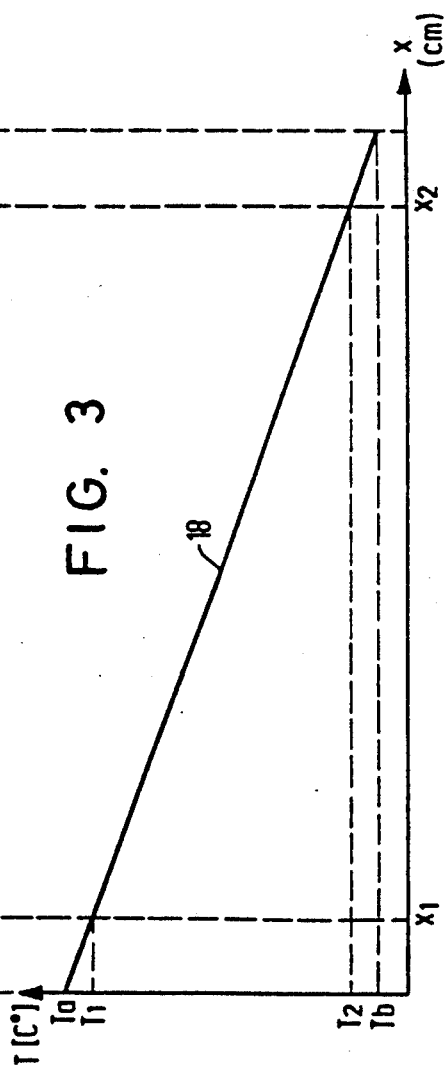
FIG. 3 shows a curve illustrating the temperature distribution along a main body of the thermostatting device according to FIGS. 1 and 2.

The thermostatting device illustrated in FIGS. 1 and 2 comprises a main body 12 of good heat-conducting properties, in the form of a solid aluminium rail of U-shaped cross-section comprising two upwardly projecting legs. Each of the longitudinal ends of the elongated main body is thermally coupled to a thermostat 14 or 16, respectively, which are indicated only diagrammatically in the drawing. The thermostats 14, 16 can be set to different temperatures $T_a$, $T_b$ which will lead to the development of a, preferably linear, temperature drop (temperature gradient) along the main body 12, as indicated by the straight line 18 in FIG. 3. The main body 12 forms on its upside, between the legs, a channel-like recessed portion 20, accommodating a sample carrier or sample holder body 22, which latter consists of a metal of good heat-conducting properties, such as aluminium, and is mounted for being displaced along the recessed portion 20. The sample holder body 22 is provided with recesses 24 adapted for receiving sample or reaction vessels 26, as indicated diagrammatically in FIG. 2. The main body is equipped with temperature sensors 22a, 22b near its ends. Another temperature sensor 22c may be arranged on the sample holder body 22. In order to ensure efficient thermal contact, the sample holder body 22 may be urged against the main body 12 by springs 28. The springs 28 are fixed by pins 30 fitted in holes 32 in the legs of the main body 12.

For effecting the displacement of the sample holder body 22 along the main body 12, the embodiment of the invention illustrated in the drawing is equipped with transport means comprising two toothed belts 34 running on guide pulleys 36, one pair of which is coupled with a drive motor 38. The transport means may comprise a position sensor, for example a potentiometer coupled with a guide pulley 36, for generating an electric signal representative of the position of the sample holder body 22 along the main body 12.

The device is provided with a thermal insulation, which is not shown in the drawing for the sake of clarity. In particular, in order to avoid heat losses, the main body 12 may be thermally insulated on all sides by an expanded plastic layer and may be provided with a thermally insulated lid. Likewise, the sample holder body 22 may be provided with a lid.

The heat flow generated by the thermostats 14, 16 in the main body 12, and the cross-section of the main body are determined, on the basis of the known laws of heat conduction, in such a way as to ensure that the amount of heat to be supplied to or to be carried off from the sample holder body 22 every time the temperature has to be changed can be given off by the main body 12 and absorbed by the sample holder body 22 or absorbed by the main body and given off by the sample holder body, respectively, within a period of time suitable for the envisaged experiments. The position of the sample holder body 22 along the main body 12 can be controlled with the aid of a computer to which is supplied the position signal received from the position sensor. If the temperature gradient is linear, the temperature distribution along the main body 12 can then be derived by the computer from the temperatures $T_a$ and $T_b$ prevailing at the ends of the main body. If the temperature distribution along the main body 12 is non-linear, then the temperature distribution can be determined for different values of $T_a$ and $T_b$, and stored in the computer. In order to speed up the change of the temperature of the sample, the whole temperature range available can be utilized. For example, if the temperature of the samples is to be raised from 30° Centigrade to 70°, the sample holder body can be run up initially to the highest temperature position available, and can then be run back towards the 70° position when the temperature sensor 24 signals that the temperature of the sample holder body 22 approaches the desired value of 70°. It is an advantage of this way of adjusting the temperature that one does not have to know exactly the development of the temperature along the carrier 12 and that one can do with a simple controller which is supplied with the actual temperature value of the sample holder body, as supplied by the temperature sensor 24, and further with a temperature setpoint value, and which then controls the transport means correspondingly.

The thermostats 14 and 16 may be usual liquid thermostats. Instead, however, one may also make use of other thermostats, for example such using heating cartridges, Peltier elements, or the like. At the low-temperature end, there may also be provided simple cooling fins, if necessary in combination with a controlled cooling blower, an ice bath, or the like.

The thermal contact between the sample holder body 22 and the main body 12 may be improved by lubricating agents and/or by the application of a vacuum for improved contact.

The main body may be equipped, between its two ends, with additional heating and/or cooling means provided each with a separate temperature sensor. The additional heating and/or cooling means may serve for linearizing the temperature gradient, or for generating a predetermined temperature gradient curve. For example, it is possible in this manner to produce sections of differently steep temperature gradients along the main body 12, in order to provide a relatively flat temperature gradient allowing exact temperature settings in temperature ranges where the temperature settings are particularly critical, and allowing on the other hand to produce steeper temperature gradients in other areas where it is desirable to have available the broadest possible temperature range.

We claim:

1. Thermostatting device for adjusting the temperature of at least one sample to any value within a predetermined temperature range, comprising a main body means elongated in a longitudinal direction offering good heat-conducting properties, said main body means having its first end thermally connected to a first thermostat means set to a first temperature and having its second end thermally connected to a second thermostat means set to a second temperature and said main body means being sized in such a way that a temperature gradient develops along said main body means between said two ends;

a heat-conductive sample holder body means for holding said at least one sample, said holder body means being supported on said main body means for displacement in said longitudinal direction and being able to be brought into contact with said main body means, for thermal coupling, at any point between said two ends;

a transport means for displacing said holder body means; and means for pressing said holder body means against said main body means, whereby the heat flow in said main body means as well as the cross-section of said main body means are selected in such a way, with a view to achieving rapid temperature changes in said samples, that the amount of heat that has to be supplied to or carried off as a result of the temperature variation caused by any displacement of said sample holder body means is transferred from said main body means to said sample holder body means and absorbed by the latter or vice versa, respectively, within a period of time suited for chemical and biochemical experiments.

2. The thermostatting device of claim 1, wherein said main body means is made from metal and exhibits substantially the cross-sectional shape of an U having two lateral legs for enclosing between them said sample holder body means.

3. Thermostatting device according to claim 2, wherein said main body means is thermally coupled between said two ends with at least one additional thermostat means.

4. Thermostatting device according to claim 1, wherein said main body means is thermally coupled between said two ends with at least one additional thermostat means.

5. Thermostatting device according to claim 1, wherein a regulating device is provided which is coupled with a temperature sensor means arranged on said sample holder body means, and with means for generating a temperature setpoint signal, for controlling said transport means.

* * * * *